United States Patent [19]

Morris et al.

[11] 4,296,007
[45] Oct. 20, 1981

[54] NITRILE RUBBER CONTAINING CADMIUM ANTIOXIDANTS

[75] Inventors: Roger E. Morris, Cuyahoga Falls; August H. Jorgensen, Jr., Rocky River, both of Ohio

[73] Assignee: The B. F. Goodrich Company, Akron, Ohio

[21] Appl. No.: 134,591

[22] Filed: Mar. 27, 1980

[51] Int. Cl.³ .......................... C08K 5/18; C08K 5/13
[52] U.S. Cl. .......................... 260/23.7 N; 252/400 R; 260/45.75 N
[58] Field of Search ................ 260/29.7 M, 29.7 NQ, 260/23.7 N, 23.7 A, 23.7 M, 45.75 W, 45.85 T, 45.85 A; 252/400

[56] References Cited

U.S. PATENT DOCUMENTS

| | | | |
|---|---|---|---|
| 2,189,417 | 2/1940 | Craig | 260/45.75 W |
| 2,849,420 | 8/1958 | Stevens et al. | 260/45.75 W |
| 3,189,630 | 6/1965 | Smutny | 260/45.75 R |
| 3,216,969 | 11/1965 | Cyba | 260/45.75 R |
| 3,723,489 | 3/1973 | Dexter et al. | 260/45.75 R |
| 3,878,150 | 4/1975 | Lohr et al. | 260/45.75 W |
| 4,077,941 | 3/1978 | Stephen et al. | 260/45.75 W |

*Primary Examiner*—V. P. Hoke
*Attorney, Agent, or Firm*—George A. Kap; J. Hughes Powell, Jr.

[57] ABSTRACT

Handling problems of cadmium curing agents are minimized by adding to a nitrile rubber latex an antioxidant in the form of a soluble alkali metal salt to form a modified latex and then coagulating the modified latex with a cadmium salt to form nitrile rubber containing bound antioxidant in the form of a cadmium compound. Alternately, a concentrate containing a large proportion of the antioxidant in the form of a cadmium compound is prepared which can be subsequently added to a nitrile latex to provide the cadmate cure function.

20 Claims, No Drawings

NITRILE RUBBER CONTAINING CADMIUM ANTIOXIDANTS

BACKGROUND OF THE INVENTION

Essentially all rubbers are susceptible to deterioration as a result of prolonged exposure to aging in an oxygen atmosphere, especially at elevated temperature. A great deal of effort has been spent and many antioxidant compositions have been suggested for use in reducing the degradative effects of oxygen on these materials. However, many of the compositions which heretofore have been suggested as antioxidants for these materials have not provided the desired long term stabilization due possibly to the tendency of many of the commercially available stabilizers to volatilize when the polymeric products are exposed to elevated temperatures over prolonged periods of time.

Nitrile rubbers normally are used when materials are required with superior resistance to oil and hydrocarbons, good heat stability, abrasion resistance and low permanent set. Therefore, in the normal use of nitrile rubbers, the loss of antioxidants by extraction and/or volatilization is expected but not desirable. Since nitrile rubbers are used widely in automotive and related industries where operating temperatures have risen gradually, the service life of such rubber parts has been affected, and a demand for higher temperature resistant and stable nitrile rubber has resulted.

REFERENCE TO A RELATED APPLICATION

Same or analogous antioxidants are disclosed in patent application entitled "Non-Fugitive Antioxidants" bearing Ser. No. 796,900 Pending Group 220 which was filed on May 16, 1977 for inventor Roger Morris. That application discloses the use of the antioxidants in the form of reaction products thereof with a polyepoxide.

SUMMARY OF THE INVENTION

This invention relates to nitrile rubber compositions containing organic antioxidants and to a process for making such compositions. More specifically, this invention relates to nitrile rubber containing an effective amount of an antioxidant in the form of a cadmium salt which is preferably prepared by adding rubber latex and the alkali metal salt of the antioxidant together with a carboxylic acid to a coagulating solution containing a cadmium coagulating salt.

DETAILED DESCRIPTION OF THE INVENTION

The cadmium oxide cure of nitrile rubbers is well known in the art. It is carried out by initially polymerizing nitrile rubber monomers in a conventional manner and then coagulating the resulting latex to form crumb rubber, in which form it is sold to a customer. The customer compounds the crumb rubber by incorporating therein various additives and finally cures the compounded nitrile rubber with cadmium oxide. Since cadmium oxide is a toxic substance, handling thereof by customer is undesirable and should be minimized.

The approach proposed herein overcomes the handling problem by customer of the toxic cadmium oxide. The invention described herein involves the preparation of a nitrile rubber latex in a known manner, addition thereto of antioxidants in the form of soluble salts thereof to form a modified latex, and then coagulation of the modified latex with a cadmium salt to form nitrile rubber. This nitrile rubber is sold to a customer where it is compounded with fillers, pigments and curing agents and then cured to form compounded rubber cured with a cadmate cure. The procedure described above can be altered somewhat by eliminating one process step. This is done by simultaneously adding antioxidant as an alkali metal salt in solution and the latex to a solution of a cadmium coagulating agent. Another modification of this concept involves the preparation of a concentrate of a nitrile rubber by adding rubber latex, a soluble salt of the antioxidant, and an alkali metal salt of a carboxylic acid to a cadmium coagulant. The concentrate can be used by a customer by simply adding it to nitrile rubber during the compounding operation.

This invention minimizes employee exposure to toxic cadmium compounds by limiting handling thereof to a plant where precautions can be more easily exercised than in a compounding or milling operation. Although employee exposure to cadmium compounds is not entirely eliminated, however, these chemicals are handled at a location which is best suited for such an operation.

This invention will now be described in more detail starting with preparation of a latex, description of suitable antioxidants, preparation of concentrates, and culminating with examples which illustrate this invention with greater specificity.

In the preparation of a latex, reaction between an acrylic nitrile and a diene is carried out in a conventional manner. The monomers are mixed in water containing emulsifying agents which have hydrocarbon groups of about 8 to 22 carbon atoms coupled to highly polar solubilizing groups such as alkali metal and ammonium carboxylate groups, sulfate half-ester groups, sulfonate groups, phosphate partial ester groups, and the like. Preferred, however, are the alkali metal salts of long chain carboxylic acids or disproportionated rosin acids. Other suitable emulsifiers in addition to those mentioned above include the non-ionic emulsifiers such as the polyether alcohols prepared by condensing ethylene oxide with higher alcohols, the fatty alkanolamine condensates, and the diglycol esters of lauric, oleic and stearic acids. The polymerization medium contains a suitable free radical generating catalyst and an activating system, as well as a chain-transfer agent. Polymerization is carried out at below 0° to 80° C. in the absence of oxygen. Polymerization is carried out to less than 100% conversion, such as to about 80% conversion, at which time, an inhibitor is added to terminate the reaction. The product at this point is a latex which is subsequently coagulated to form a copolymer in crumb form which, in turn, is compounded to produce a rubber compound which becomes a vulcanizate after curing or vulcanization.

The polymerization catalyst can be any of those commonly employed for the polymerization of diene hydrocarbons including the various peroxygen compounds such as hydrogen peroxide, benzoyl peroxide, cumene hydroperoxide, tertiary butyl hydroperoxide, and tertiary butyl perbenzoate. Generally, from about 0.01 to about 3 parts of the catalyst is employed per hundred parts by weight of the monomers in the polymerization charge.

In conventional practice, incorporation of antioxidants into a nitrile rubber latex is accomplished by well known techniques. Usually, an emulsion or suspension of the antioxidant is prepared and added to the latex. For example, the antioxidant can be dissolved in isopropyl acetate and this solution added with stirring to distilled water containing a small amount of the sodium salt of dodecylbenzene sulfonate at an alkaline pH. This mixture can be passed through a homogenizer a number of times. Other solvents for the antioxidants, such as benzene, toluene, etc., can be used in lieu of isopropyl acetate.

Suitable antioxidants for the purpose of providing improved thermal aging resistance included those defined by structural formulas A, B and C, which are presented below:

$$\text{ArNHArN} \begin{matrix} R \\ \diagdown \\ R^1 \overset{O}{\underset{\|}{C}} OH \end{matrix} \quad \text{Formula A}$$

where Ar is an aromatic group, preferably phenyl; R is hydrogen, alkyl group of 1 to 4 carbon atoms, or oxyalkylene group of 1 to 4 carbon atoms; $R^1$ is alkylene group of 1 to 20 carbon atoms but preferbly 2 to 8, $$-\overset{O}{\underset{\|}{C}}R^2-$$

group wherein $R^2$ is alkylene group of 1 to 20 carbon atoms but preferably 2 to 8, or $$-(R^3O)_n\overset{O}{\underset{\|}{C}}R^2- \text{ group}$$

where $R^3$ is alkylene group of 1 to 8 carbon atoms but preferably 2 to 4 and n is a number of 1 to 20 but preferably 1 to 8.

$$\text{ArNHAr}-R^4\overset{O}{\underset{\|}{C}}OH \quad \text{Formula B}$$

where Ar is an aromatic group, preferably phenyl; and $R^4$ is $$-\overset{O}{\underset{\|}{O}}CR^2- \text{ group}$$

or $-OR^2-$ group where $R^2$ is alkylene group of 1 to 20 carbon atoms, but preferably 2 to 8.

$$(OH)(R^5)(R^6)ArR^2\overset{O}{\underset{\|}{C}}OH \quad \text{Formula C}$$

where Ar is aromatic group, preferably phenyl; $R^2$ is alkylene group of 1 to 20 carbon atoms but preferably 1 to 8; and $R^5$ and $R^6$ are same or different groups selected from hydrogen and alkyl groups attached to the Ar group which individually contain 1 to 8 carbon atoms but preferably 1 to 4.

Some specific examples of the antioxidants identified above are the following where designations Ph and naph represent phenyl and naphthyl groups, respectively:

1. Ph—NH—Ph—NHCCH$_2$CH$_2$COH (with O= on each C)

2. naph-NH—Ph—NHCCH$_2$CH$_2$CH$_2$COH (with O= on each C)

3. Ph—NH—Ph—N(CH$_2$CH$_3$)(CCH$_2$CH$_2$COH) with O= on each C

4. Ph—NH—Ph—NHCH$_2$CH$_2$COH (with O=)

5. Ph—NH—Ph—OCCH$_2$CH$_2$COH (with O= on each C)

6. Ph—NH—Ph—OCH$_2$CH$_2$COH (with O=)

7. (CH$_3$)$_2$CH, HO—Ph—CH$_2$CH$_2$COH, (CH$_3$)$_2$CH (with O=)

8. Ph—NH—Ph—NHCH$_2$CH$_2$OCH$_2$CH$_2$OCCH$_2$COH (with O= on each C).

The antioxidants disclosed herein are available commercially or can be prepared from commercially available materials.

Amount of antioxidant in the form of a cadmium salt in the nitrile rubber should be in the range of 0.1 to 10 parts by weight, preferably 0.5 to 5, and amount of the cadmium salt of a carboxylic acid should be from 1 to 10 parts, preferably 3 to 8 parts, based on 100 parts of nitrile rubber.

Another aspect of this invention is directed to the preparation of a concentrate containing relatively small amounts of nitrile rubber combined with a large amount of cadmium salt of a carboxylic acid and antioxidant. This concentrate can be sold to a customer for use as an ingredient in compounding nitrile rubber for curing. On the basis of 100 parts of nitrile rubber, amount of cadmium salt of a carboxylic acid can vary from 40 to 80 parts and amount of antioxidant can vary from 5 to 20 parts. In adding the concentration to nitrile rubber, it is desired to have about 1 to 10, preferably 3 to 8 parts of cadmium salt of carboxylic acid per 100 parts of nitrile rubber and 0.1 to 10 parts, preferably 0.5 to 5 parts, of the cadmium salt of the antioxidant.

The following is a typical formulation for preparing a nitrile rubber latex, given in parts by weight:

| | |
|---|---|
| butadiene | 72 |
| acrylonitrile | 25 |
| emulsifier | 4.5 |
| t-dodecyl mercaptan | 0.5 |
| potassium chloride | 0.3 |
| soluble chelated iron | 0.01 |
| sodium formaldehyde sulfoxylate | 0.08 |
| cumene hydroperoxide | 0.10 |
| water | 180 |

The chelating agent can be Sequestrene NaFe which contains 13% iron chelated with ethylene diamine tetraacetic acid.

In addition to acrylonitrile, other nitriles suitable for the preparation of nitrile rubber are defined by the following structural formula:

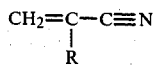

where R can be hydrogen, halogen such as chlorine, an alkyl radical of 1 to 8 carbon atoms, preferably 1 to 2 carbon atoms, or an aryl radical such as phenyl. Of the monomer charge consisting of a nitrile and a diene, in excess of about 40%, preferably in excess of about 60%, is the diene. Other suitable dienes, in addition to butadiene, are those which are embraced by the following structural formula:

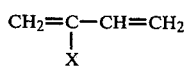

where X can be hydrogen, halogen such as chlorine, alkyl radical of 1 to 5 carbon atoms, or an aryl radical. Preferred nitrile rubber is prepared by copolymerizing butadiene, chloroprene, isoprene or a mixture thereof, with acrylonitrile, chloroacrylonitrile, methacrylonitrile, or a mixture thereof. Most preferred nitrile rubber is essentially a copolymer of a major proportion of butadiene and a minor proportion of acrylonitrile.

Up to about 20% by weight of the diene and/or the nitrile can be replaced by non-crosslinking ethylenically unsaturated monomers copolymerizable with the diene, such as the various vinyl monomers. Examples of such vinyl monomers include acrylic and methacrylic acids and/or their derivatives such as acrylamide, methacrylamide, and methyl, ethyl, propyl, butyl, 2-ethylhexyl, and decyl esters of acrylic and methacrylic acids; vinyl halides, such as vinyl chloride and vinylidene chloride; vinyl esters such as vinyl acetate and vinyl propionate; vinyl aromatic compounds such as styrene and alpha-methyl styrene; and vinyl toluenes and vinyl ethers, such as vinyl isobutyl ether.

The latex is coagulated with the aid of cadmium salts, such as cadmium chloride and cadmium nitrate. This is achieved by adding antioxidants to the latex in the form of alkali metal salts to form a modified latex which is then coagulated in a cadmium salt solution. Another approach involves the separate but simultaneous addition of latex and antioxidants to a cadmium salt solution. Still another variation of the basic concept involves mixing carboxylic-type emulsifiers and antioxidants with the latex followed by addition of the modified latex to the coagulating solution. More specifically, this latter variation involves addition of rubber latex and a solution of a carboxylic acid, alkali metal hydroxide and the antioxidant to a cadmium coagulating solution. The carboxylic acid and the antioxidant in the solution with alkali metal hydroxide are converted respectively to an alkali metal salt of the carboxylic acid and an alkali metal salt of the antioxidant. When this solution is added to the cadmium coagulating solution together with rubber latex, the alkali metal salt of the antioxidant is converted to a cadmium compound and the salt of the carboxylic acid is converted to a cadmium salt. Whichever approach is taken to coagulate the latex, the net effect is to bring the cadmium salt coagulating agent in contact with the antioxidant which is thereby converted to a cadmium compound. The cadmium compound of the antioxidant is insoluble in water and is thus retained within the coagulated latex.

The carboxylic acids referred to herein are fatty acids which contain about 8 to 20 carbon atoms per molecule. Examples of such acids include stearic, lauric, oleic, etc.

At this point, coagulated latex is in the form of a solid raw synthetic nitrile rubber which is sold to a customer. There is no need on the part of the customer to handle any toxic antioxidant since it has already been incorporated therein. The customer can add any desired fillers, pigments, curing agents, etc., and cure the raw nitrile rubber to form a cured nitrile rubber. The additives to the solid rubber are conventional and are well known to those skilled in the art. The sulfur curing agents and the other components added to the solid rubber are worked in on a mill or an internal mixer in the amounts normally used in the art, and the rubber is cured to a full cure, as determined by a curometer measurement. The customer also has the option of using the concentrate by adding it to nitrile rubber along with other compounding ingredients. Handling of the cadmium compounds is thus minimized and yet benefits of the cadmate cure are retained.

The utility of the antioxidant compositions of this invention as stabilizers for rubber compositions is demonstrated by the results of the tests on the various compounds reported below. As can be seen from the test results, the antioxidant compositions of the invention improve the ability of the rubber compositions to retain the desirable mechanical properties after a period of aging. Although not all of the compositions and tests reported herein were prepared and conducted at the same time or under identical conditions, the reported results indicate quite clearly the relative effectiveness of the antioxidants of the invention and particularly, the superior aging characteristics of rubber compositions containing such antioxidants.

The data below is reported in terms of tensile strength at break, as determined with a table model Instron, percent elongation at break, and Shore Durometer A hardness of the rubber composition for the rubber samples as cured after air aging for three days at 300° F., pursuant to ASTM test D865. Since nitrile rubbers are particularly susceptible to embrittlement on aging, the results of the tests reported below have particular significance in establishing the effectiveness of the antioxidants. Accordingly, a value for $\Delta E$ is recorded in the following tables and is a measure of the change in percent elongation at break after the aging period under the conditions indicated. This value is calculated as follows:

$$\Delta E = \frac{\text{Original elongation} - \text{Final elongation}}{\text{Original elongation}} \times 100$$

In the examples which follow, numerous samples were prepared with two masterbatches, Masterbatch A, which contained the antioxidant in a concentrate form; and Masterbatch B, which did not contain any antioxidant. The two masterbatches were prepared in a conventional manner by mixing the compounds which are set forth below:

|  | MASTERBATCH | |
| --- | --- | --- |
|  | A | B |
| Hycar 1042F Latex | 100 | 100 |
| Zinc Oxide | 3.0 | 3.0 |
| Hi-Si Silica Reinforcing Filler | 35 | 35 |
| N 999 Carbon Black | 30 | 30 |
| Silene A-189 Coupling | 0.4 | 0.4 |

-continued

| | MASTERBATCH | |
|---|---|---|
| | A | B |
| Agent | | |
| Antioxidant Concentrate | 8.7 | — |
| Mark WS Emulsifier | — | 5.0 |
| | 177.1 | 174.4 |

The Hycar latex is a polymer of 67% butadiene and 33% acrylonitrile, on weight basis; the coupling agent is gammamercaptopropyltrimethoxysilane; and Mark WS is a mixture containing cadmium and barium salts of a fatty carboxylic acid. The antioxidant concentrate was prepared from the following reagents:

| I. | distilled water | 700 ml |
|---|---|---|
| | cadmium chloride | 22 g |
| | magnesium chloride (MgCl$_2$6H$_2$O) | 4.25 g |
| II. | lauric acid | 42.8 g |
| | amic acid (Ph—NH—Ph—NHCCH$_2$CH$_2$COH) with two C=O groups | 15.2 g |
| | potassium hydroxide pellets | 15.4 g |
| | distilled water | 300 ml |
| III. | butadiene acrylonitrile latex | 250 g |
| | distilled water | 100 ml |

In the preparation of the antioxidant concentrate, the amount of cadmium chloride employed was somewhat less than the stoichiometric requirement for the emulsifier and the antioxidant, so magnesium chloride was used to compensate for this deficiency of cadmium chloride. This approach insures that all of the toxic cadmium chloride is reacted and none is left as an excess. Potassium hydroxide was, of course, used to convert lauric acid and the antioxidant in the second reagent to an alkali metal salt thereof, as explained previously. Reagent II was added with rapid stirring to reagent I maintained at 53° C. until about 100 ml thereof was added. At this point, simultaneous addition of reagents II and III to reagent I was made with rapid stirring with formation of finely divided precipitate. Serum was decanted and a clear light yellow precipitate was obtained which was the antioxidant concentrate and cadmium soap.

The following examples are presented for the purpose of illustrating the subject invention with particularity, especially with respect to the novel aspect thereof and less so with respect to aspects well known in the art.

EXAMPLES

Samples were compounded using masterbatches A and B and ingredients listed below in indicated amounts by weight. All of 177.1 grams of masterbatch A and all of 174.4 grams of masterbatch B were used. These samples were tested initially and again following aging, which was conducted pursuant to ASTM procedures. Results are given below. Samples denoted by letters A and B are indicative of the particular masterbatch that was used in their preparation. It should be remembered that masterbatch B did not contain any antioxidant concentrate and the cadmium salt of the carboxylic acid was added during mixing.

| | 1A | 2A | 3A | 4B | 5B | 6A | 7A | 8B |
|---|---|---|---|---|---|---|---|---|
| Morfax | 3.56 | 3.56 | 3.56 | 3.56 | 3.56 | 3.56 | — | — |
| Magnesium Oxide | 3.0 | — | — | 3.0 | 3.0 | 3.0 | 3.0 | 3.0 |
| Sulfosan R | 1.3 | 1.3 | 1.3 | 1.3 | 1.3 | 1.3 | 1.3 | 1.3 |
| M BTS | — | — | — | — | — | — | 2.0 | 2.0 |
| Naugard 445 | — | — | 2.0 | 2.0 | — | — | — | — |
| 1776 AO | 1.0 | 1.0 | — | — | 1.0 | — | 1.0 | 1.0 |
| 1523 AO | — | — | — | — | 1.0 | — | — | 1.0 |
| 121 AO | — | — | — | — | — | 1.0 | — | — |
| Original Opt. Cure @ 338° F. | | | | | | | | |
| Optimum Cure Time (min.) | 8 | 8' | 9' | 8' | 8' | 10' | 9' | 12' |
| 100% Modulus | 410 | 445 | 465 | 410 | 1020 | 410 | 210 | 230 |
| 300% Modulus | 1695 | 1950 | 2000 | 1615 | 1640 | 1650 | 750 | 815 |
| Tensile Strength | 1935 | 2325 | 2435 | 2110 | 2190 | 2195 | 2745 | 2650 |
| Elongation | 336 | 370 | 375 | 400 | 412 | 400 | 695 | 685 |
| Hardness | 73 | 73 | 73 | 73 | 74 | 72 | 65 | 67 |
| Air Aged 3 Days @ 300° F. | | | | | | | | |
| 100% Modulus | 615 | 660 | 630 | 680 | 715 | 610 | 340 | 395 |
| 300% Modulus | — | — | — | — | — | 2070 | 1160 | 1350 |
| Hardness | 73 | 73 | 73 | 75 | 75 | 72 | 69 | 69 |
| Tensile Strength | 1880 | 1920 | 2320 | 1835 | 1990 | 2135 | 2195 | 2200 |
| Elongation | 265 | 225 | 290 | 240 | 260 | 315 | 545 | 520 |
| Change in Elongation $\Delta$ E | −21 | −39 | −23 | −40 | −37 | −21 | −22 | −24 |

Morfax is morpholinyl benzothiazyl disulfide which functions as a delayed action accelerator for sulfur curing; Sulfasan R is dithiodimorpholine, a sulfur donor; MBTS is an acronym for mercaptobenzothiazole disulfide, which functions as a delayed action accelerator; Naugard 445 is antioxidant and a reaction product of diphenyl amine and alpha-methylstyrene; 1776 antioxidant is a reaction product of paraaminodiphenyl amine with a diglycidyl ether of Bisphenol A; 1523 antioxidant is a reaction product of para-aminodiphenyl amine and succinic anhydride which yields a succinimic acid; and 121 antioxidant is a reaction product of dimethyl butylphenyl phenylenediamine, acrylic acid, and diglycidyl ether of 1,4-butanediol.

Change in elongation ($\Delta$E) for Sample 1A was −21 whereas for Sample 2A it was −39. The only difference between these samples was in that Sample 2A contained 3 parts of magnesium oxide and Sample 1A did not. Compared to Sample 1A, Sample 3A did not contain any magnesium oxide, nor any 1776 antioxidant but it did have 2 parts of Naugard 445 which is a reaction product of diphenylamine with alpha-methyl styrene and functions as an antioxidant. $\Delta$E for Sample 3A was a modest −23. Sample 4B, prepared with a masterbatch B which did not contain the amic acid antioxidant, is otherwise similar to Sample 3A with the exception of the absence of 3 parts of magnesium oxide. Apparently, due to the absence of amic acid antioxidant, $\Delta$E for Sample 4B was a hefty −40, or about double that for Samples 1A and 3A. Sample 5B is considered to be the control for the experiments described herein. It was prepared with masterbatch B which did not contain any pre-formed salt of the amic acid antioxidant, but it did contain 1 part of 1523 antioxidant, which is amic acid, and 1 part of 121 antioxidant. ΔE for Sample 5B was about −40, or about twice that for Sample 1A. Sample 6A showed a ΔE of −21 or about the same as Sample 1A although it did not contain any 1776 antioxidant. Sample 6A had substantially the same ΔE as Sample 1A and Sample 8B had a ΔE of only −24.

Sample 1A and 4B appear to be best for comparison purposes. Whereas ΔE for Sample 1A was only −21, ΔE for Sample 4B was −40, indicating substantial deterioration in elongation due to aging at elevated temperature.

We claim:

1. Nitrile rubber, which is a polymer of a nitrile and more than 40% diene, containing an effective amount of one or more of the following anitoxidants in the form of cadmium salts:

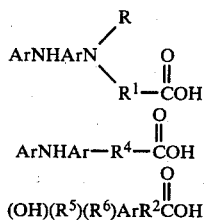

where Ar is an aromatic group; R is hydrogen, alkyl group of 1 to 4 carbon atoms, or oxyalkylene group of 1 to 4 carbon atoms; $R^1$ is alkylene group of 1 to 20 carbon atoms,

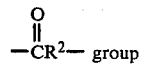

where $R^2$ is alkylene group of 1 to 20 carbon atoms,

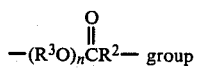

where $R^3$ is alkylene group of 1 to 8 carbon atoms, and n is a number of 1 to 20; $R^4$ is

or —$OR^2$— group; and $R^5$ and $R^6$ are same or different groups attached to the Ar group which are selected from hydrogen and alkyl radicals which individually contain 1 to 8 carbon atoms; the nitrile is defined by the formula

where R is selected from hydrogen, halogens, alkyl radicals of 1 to 8 carbon atoms, and aryl radicals; and the diene is defined by the formula

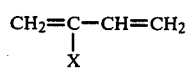

where X is selected from hydrogen, halogens, alkyl radicals of 1 to 5 carbon atoms, and aryl radicals.

2. Composition of matter of claim 1 containing 0.1 to 10 parts of the antioxidant on the basis of 100 parts of the nitrile rubber.

3. Composition of matter of claim 1 containing 0.5 to 5 parts of the antioxidant per 100 parts of the nitrile rubber wherein the Ar symbol represents phenyl group and R in the nitrile is selected from hydrogen, chlorine, alkyl radicals of 1 to 2 carbon atoms, and phenyl radicals.

4. Composition of matter of claim 1 containing 0.1 to 10 parts of the antioxidant and 1 to 40 parts of a cadmium salt of a carboxylic acid, per 100 parts of the nitrile rubber.

5. Composition of matter of claim 4 wherein the antioxidant is selected from substances having the following formula:

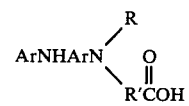

wherein Ar is a phenyl group; R' is alkylene group of 2 to 8 carbon atoms,

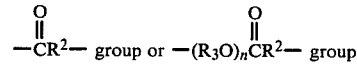

where $R^2$ is alkylene group of 2 to 8 carbon atoms, $R^3$ is alkylene group of 2 to 4 carbon atoms, and n is a number of 1 to 8.

6. Composition of matter of claim 5 wherein the nitrile rubber contains at least 60% conjugated diene polymerized therein, the nitrile being selected from acrylonitrile, chloroacrylonitrile, methacrylonitrile, and mixtures thereof; and the diene is selected from butadiene, chloroprene, isoprene, and mixtures thereof.

7. Composition matter of claim 6 wherein the diene rubber is a copolymer of butadiene and acrylonitrile.

8. Antioxidant concentrate containing 40 to 80 parts fatty acid in the form of a cadmium salt emulsifier and 5 to 20 parts of antioxidant per 100 parts of synthetic nitrile rubber, wherein the nitrile rubber is a polymer of a nitrile and more than 40% diene the antioxidant is in the form of a cadmium compound selected from the following antioxidants:

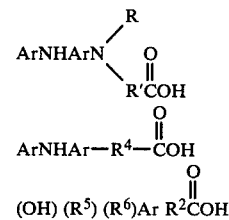

where Ar is an aromatic group; R is hydrogen, alkyl group of 1 to 4 carbon atoms, or oxyalkylene group of 1 to 4 carbon atoms; R' is alkylene group of 1 to 20 carbon atoms,

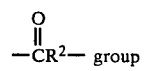

where $R^2$ is alkylene group of 1 to 20 carbon atoms,

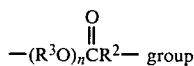

where $R^3$ is alkylene group of 1 to 8 carbon atoms, and n is a number of 1 to 20; $R^4$ is

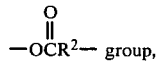

or $-OR^2-$ group; and $R^5$ and $R^6$ are same or different groups attached to the Ar group which are selected from hydrogen and alkyl radicals which individually contain 1 to 8 carbon atoms.

9. Concentrate of claim 8 where the symbol Ar represents phenyl group.

10. Concentrate of claim 8 wherein the antioxidant is in the form of a cadmium salt of the following substance represented by the following formula:

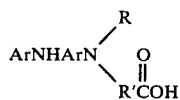

where the symbol Ar represents a phenyl group; R' is alkylene group of 2 to 8 carbon atoms,

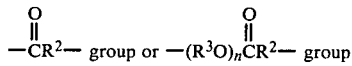

where $R^2$ is alkylene group of 2 to 8 carbon atoms, $R^3$ is alkylene group of 2 to 4 carbon atoms, and n is a number of 1 to 8.

11. Concentrate of claim 8 wherein the nitrile rubber is a diene rubber containing at least 40% conjugated diene.

12. Concentrate of claim 11 wherein the diene rubber is a compolymer of butadiene and acrylonitrile.

13. In the process for making finished synthetic nitrile rubber, the improvement comprising contacting nitrile rubber latex wherein the nitrile rubber is a polymer of a nitrile and more than 40% diene with cadmium coagulating agent and an effective amount of one or more of the antioxidants, in the form of alkali metal salts which are converted to cadmium salts upon contact with the cadmium coagulating agent, the antioxidants are represented by the following formulas:

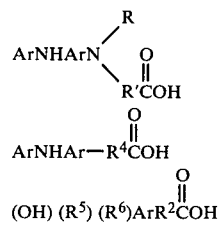

where Ar is an aromatic group; R is hydrogen, alkyl group of 1 to 4 carbon atoms, or oxyalkylene group of 1 to 4 carbon atoms; R' is alkylene group of 1 to 20 carbon atoms,

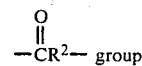

where $R^2$ is alkylene group of 1 to 20 carbon atoms,

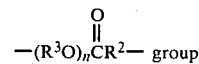

where $R^3$ is alkylene group of 1 to 8 carbon atoms, and n is a number of 1 to 20; $R^4$ is

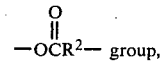

or $-OR^2-$ group; and $R^5$ and $R^6$ are same or different groups attached to the Ar group which are selected from hydrogen and alkyl radicals which individually contain 1 to 8 carbon atoms.

14. Process of claim 13 wherein amount of the antioxidant in the form of cadmium salts is 0.1 to 10 parts per 100 parts of nitrile rubber.

15. Process of claim 13 wherein amount of the antioxidant is 0.5 to 5 parts per 100 parts of nitrile rubber and wherein the antioxidant is selected from substances having the following formula:

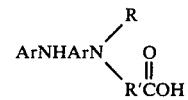

wherein Ar is a phenyl group; R' is alkylene group of 2 to 8 carbon atoms,

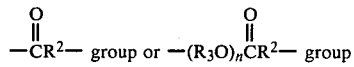

where $R^2$ is alkylene group of 2 to 8 carbon atoms, $R^3$ is alkylene group of 2 to 4 carbon atoms, and n is a number of 1 to 8.

16. Process for preparing antioxidant concentrate containing up to 20 parts antioxidant of claim 1 in the form of a cadmium compound per 100 parts of nitrile rubber comprising contacting synthetic rubber latex with reagent I and reagent II to coagulate and to convert the latex to raw nitrile rubber and to convert the alkali metal salt of the antioxidant to a cadmium compound thereof, and recovering the concentrate in solid form, reagent I comprising a cadmium salt coagulant and reagent II comprising carboxylic type emulsifier and the antioxidant in the form of an alkali metal salt thereof.

17. Process of claim 16 wherein pH of the second reagent is in excess of about 10, and wherein reagent II is prepared by admixing with water a carboxylic acid of about 8 to 20 carbon atoms, an alkali metal hydroxide, and the antioxidant.

18. Process of claim 17 wherein amount of the carboxylic type emulsifier is 40 to 80 parts and amount of the antioxidant is 5 to 20 parts per 100 parts of nitrile rubber.

19. Process of claim 18 wherein the antioxidant is selected from those defined by the following formula:

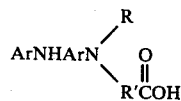
wherein Ar is a phenyl group; R' is alkylene group of 2 to 8 carbon atoms,
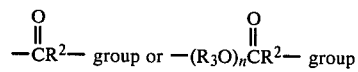
where $R^2$ is alkylene group of 2 to 8 carbon atoms, $R^3$ is alkylene group of 2 to 4 carbon atoms, and n is a number of 1 to 8.
20. Process of claim 19 wherein the nitrile latex is a copolymer of butadiene and acrylonitrile containing at least 40% butadiene.
* * * * *

UNITED STATES PATENT AND TRADEMARK OFFICE
CERTIFICATE OF CORRECTION

PATENT NO. : 4,296,007
DATED : October 20, 1981
INVENTOR(S) : ROGER E. MORRIS and AUGUST H. JORGENSEN, JR.

It is certified that error appears in the above-identified patent and that said Letters Patent are hereby corrected as shown below:

Claim 1, line 55 reads as: "$CH=C-C\equiv N$
$$R$$

Should read as: -- $CH_2=\underset{R}{C}-C\equiv N$

*Signed and Sealed this*

*Twenty-fourth* Day of *September 1985*

[SEAL]

*Attest:*

DONALD J. QUIGG

*Attesting Officer*   *Commissioner of Patents and Trademarks—Designate*